United States Patent
Wirola et al.

(10) Patent No.: US 8,686,901 B2
(45) Date of Patent: Apr. 1, 2014

(54) POSITIONING USING A REFERENCE STATION

(75) Inventors: Lauri Wirola, Tampere (FI); Jari Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 442 days.

(21) Appl. No.: 12/451,469

(22) PCT Filed: May 18, 2007

(86) PCT No.: PCT/IB2007/051901
§ 371 (c)(1),
(2), (4) Date: Nov. 13, 2009

(87) PCT Pub. No.: WO2008/142485
PCT Pub. Date: Nov. 27, 2008

(65) Prior Publication Data
US 2010/0090890 A1    Apr. 15, 2010

(51) Int. Cl.
*G01S 19/44* (2010.01)

(52) U.S. Cl.
USPC .................................. 342/357.27

(58) Field of Classification Search
USPC .................. 342/357.04, 357.27, 357.72
See application file for complete search history.

(56) References Cited

U.S. PATENT DOCUMENTS

| 5,646,630 A | 7/1997 | Sheynblat et al. |
| 5,884,220 A | 3/1999 | Farmer et al. |
| 6,061,632 A | 5/2000 | Dreier |
| 7,498,979 B2 * | 3/2009 | Liu et al. ............... 342/357.27 |
| 2005/0101248 A1 * | 5/2005 | Vollath ..................... 455/12.1 |
| 2005/0231423 A1 * | 10/2005 | Han et al. ............... 342/357.02 |
| 2006/0232467 A1 * | 10/2006 | Small .................. 342/357.09 |
| 2008/0122686 A1 | 5/2008 | Wirola |
| 2008/0165053 A1 * | 7/2008 | Liu et al. ............... 342/357.03 |

FOREIGN PATENT DOCUMENTS

| WO | WO 2006/043123 | 4/2006 |
| WO | WO 2007/032947 | 3/2007 |
| WO | WO 2007/138388 | 12/2007 |
| WO | WO 2008/035139 | 3/2008 |

* cited by examiner

*Primary Examiner* — Cassie Galt
(74) *Attorney, Agent, or Firm* — Locke Lord LLP (57) ABSTRACT

For supporting a change of a reference station, first data that is valid for a first reference station is provided for transmission to a device, then data that is valid for the first reference station and data that is valid for a second reference station is provided for transmission to the device in parallel for a limited time, and finally data that is valid for the second reference station is provided for transmission to the device. The data for the first reference station and the data for the second reference station include measurements on satellite signals. At a receiving end, the respectively received data can be provided for a positioning of a device comprising a satellite signal receiver.

18 Claims, 5 Drawing Sheets

POSITIONING USING A REFERENCE STATION

CROSS REFERENCE TO RELATED APPLICATIONS

This application is the U.S. National Stage of International Application Number PCT/IB2007/051901 filed on May 18, 2007 which was published in English on Nov. 27, 2008 under International Publication Number WO 2008/142485.

FIELD OF THE INVENTION

The invention relates to the field of positioning a device comprising a satellite signal receiver, and more specifically to a positioning based on measurements on satellite signals that are provided for a reference station.

BACKGROUND OF THE INVENTION

An absolute positioning of a device is supported by various Global Navigation Satellite Systems (GNSS). These include for example the American Global Positioning System (GPS), the Russian Global Navigation Satellite System (GLONASS), the future European system Galileo, the Space Based Augmentation Systems (SBAS), the Japanese GPS augmentation Quasi-Zenith Satellite System (QZSS), the Locals Area Augmentation Systems (LAAS), and hybrid systems. The satellites of these systems are also referred to as space vehicles (SV).

The constellation in GPS, for example, consists of more than 20 satellites that orbit the earth. Each of the satellites transmits two carrier signals L1 and L2. One of these carrier signals L1 is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo random noise (PRN) code, which is spreading the spectrum over a 1 MHz bandwidth. It is repeated every 1023 bits, the epoch of the code being 1 ms. The carrier frequency of the L1 signal is further modulated with navigation information at a bit rate of 50 bit/s. The navigation information comprises inter alia ephemeris and almanac parameters. Ephemeris parameters describe short sections of the orbit of the respective satellite. Based on these ephemeris parameters, an algorithm can estimate the position of the satellite for any time while the satellite is in the respective described section. The almanac parameters are similar, but coarser orbit parameters, which are valid for a longer time than the ephemeris parameters. The navigation information further comprises for example clock models that relate the satellite time to the system time of GPS and the system time to the Coordinated Universal Time (UTC).

A GPS receiver of which the position is to be determined receives the signals transmitted by the currently available satellites, and it detects and tracks the channels used by different satellites based on the different comprised C/A codes. Then, the receiver determines the time of transmission of the code transmitted by each satellite, usually based on data in the decoded navigation messages and on counts of epochs and chips of the C/A codes. The time of transmission and the measured time of arrival of a signal at the receiver allow determining the pseudorange between the satellite and the receiver. The term pseudorange denotes the geometric distance between the satellite and the receiver, which distance is biased by unknown satellite and receiver offsets from the GPS system time.

In one possible solution scheme, the offset between the satellite and system clocks is assumed known and the problem reduces to solving a non-linear set of equations of four unknowns (3 receiver position coordinates and the offset between the receiver and GPS system clocks). Therefore, at least 4 measurements are required in order to be able to solve the set of equations. The outcome of the process is the receiver position.

Similarly, it is the general idea of GNSS positioning to receive satellite signals at a receiver which is to be positioned, to measure the pseudorange between the receiver and the respective satellite and further the current position of the receiver, making use in addition of estimated positions of the satellites. Usually, a PRN signal which has been used for modulating a carrier signal is evaluated for positioning, as described above for GPS.

In a further approach, the carrier phases and/or the code phases measured at two GNSS receivers are evaluated for determining the distance and attitude between the two receivers very accurately, typically at cm- or even mm-level accuracy. The combination of the distance and attitude between two receivers, and thus the vector between these receivers, is also referred to as baseline. The carrier phase measurements that are performed at GNSS receivers may be exchanged in real-time, near real-time or be stored for a later exchange known as post-processing. Usually, one of the GNSS receivers is arranged at a known location and called reference station, while the other receiver is to be positioned with respect to the reference station and called user receiver or rover. The determined relative position can further be converted into an absolute position, if the location of the reference station is accurately known. However, the relative positioning calculations actually require that the positions of both receivers are known at least approximately. These positions can be obtained from determined pseudoranges. Alternatively, it would also be sufficient to know only a reference location approximately, since the rover location can be obtained therefrom by adding the baseline estimate to the reference location.

A satellite signal is distorted on its way from a satellite to a receiver due to, for instance, multipath propagation and due to influences by ionosphere and troposphere. Moreover, the satellite signal has a bias due to the satellite clock bias. All errors that are common to a signal in both receivers can be assumed to correlate between the receivers and satellites, and thus to vanish in double differencing.

The relative positioning may thus be based more specifically on signal measurements at two GNSS receivers, which are used to form double difference observables. Such signal measurements may include for example carrier phase measurements and PRN code measurements, etc. A double difference observable relating to the carrier phase is the difference in the carrier phase of a specific satellite signal at both receivers compared to the difference in the carrier phase of another satellite signal at both receivers. A double difference observable relating to the PRN code may be obtained correspondingly. The double difference observables can then be employed for determining the position of the receivers relative to each other at high accuracy.

With conventional GNSS positioning, two GNSS receivers are able to determine their location, and therefore the baseline between them, with an accuracy of 5 to 20 meters. The carrier or code phase based approach, in contrast, allows determining the baseline with a much higher accuracy of 0.1 to 10 cm. It is noteworthy that this accuracy can be achieved with standard commercial GNSS-receivers.

When using the carrier or code phase based approach, however, it has to be considered that a carrier or code phase measured at two receivers is based on different number of whole cycles of the carrier or code. This effect is referred to as double-difference integer ambiguity, which has to be solved. This process is also called integer ambiguity resolution or initialization.

The double-difference integer ambiguity may be resolved by gathering carrier and/or code phase data from a sufficient number of satellites at sufficient measurement instants.

Instead of double-difference integer ambiguities various other ambiguities could be considered and solved as well.

Once the baseline has been determined and the integer ambiguity been resolved, the integer ambiguity solution may be validated in order to determine whether it can be relied on. Integer ambiguity validation is typically done using statistical tools.

The solved and validated integer ambiguities may then be used for tracking the baseline between the receivers at high precision, for instance with a sub-cm accuracy.

The carrier phase measurement performed by a GNSS receiver on a GNSS signal originating from a GNSS space vehicle is also called 'accumulated delta range (ADR) measurement' or 'integrated Doppler measurement'.

Originally, carrier phase based positioning was only available for geodesic surveying and other applications requiring high accuracy. The equipment required for such applications is expensive and meant, therefore, only for professional use. In these cases, the baseline is moreover often determined off-line. However, it is also possible to obtain a high-precision baseline using two low-cost GNSS-enabled handsets, for example terminals with integrated GNSS-receiver or terminals equipped with an external Bluetooth GNSS-receiver. The data between the terminals can be exchanged using any kind of data transfer technology, like general packet radio service (GPRS), wireless local area networks (WLAN) or Bluetooth™. This allows the baseline to be determined and updated in real-time or near real-time. This approach is also called mobile Real-Time Kinematics (mRTK), indicating that mobile technology is used to expand the carrier-phase based use cases and bring the benefits of the technology to a wider audience. Instead of a second handset, the reference station could also be for instance a location measurement unit (LMU) of a network or a virtual reference station (VRS) for which the required measurement data is provided.

When using a virtual reference station, a baseline is determined between the rover and a computationally produced station. This allows performing a relative positioning with only one physical receiver. Moreover, the absolute position of the virtual reference station is known accurately and, hence, also that of the rover once the baseline is solved. The relative positioning calculation for a physical receiver and a virtual reference station are the same as the relative positioning calculation for two physical receivers.

SUMMARY OF THE INVENTION

The invention proceeds from the consideration that using a short baseline between a rover and a reference station improves the reliability and speed of a baseline determination. Further, a short baseline may allow neglecting unknown terms representing troposphere delay and ionosphere advance in integer ambiguity resolution.

When a rover is moving, the length of the baseline to an employed reference station may increase and exceed a value that is considered appropriate.

When using a virtual reference station as a reference station, this problem may be avoided by using a moving virtual reference station. However, such an approach has the disadvantage that the rover must have a real-time or near real-time feedback loop to a server providing the measurement data for the virtual reference station in order to be able to control the velocity of the virtual reference station. Implementing a moving virtual reference station is, therefore, not feasible in many cases.

Alternatively, the reference station could be changed whenever the baseline exceeds a suitable maximal length. Also a change of reference station can be realized in particular, though not exclusively, when relying on a virtual reference station. In this case, a rover could request a new reference station whenever noting that the baseline length exceeds some predetermined or adaptively determined threshold. A server could then send measurements for the new reference station instead of the old reference station to the rover. When the rover receives the measurements for the new reference station, it has to solve integer ambiguities for the new reference station before being able to track the baseline to the new reference station, though. Such an initialization is time consuming. Each change of reference station will thus result in an interruption of the high-precision navigation.

A first method is described, which comprises receiving data that is valid for a first reference station, then receiving in parallel for limited time data that is valid for the first reference station and data that is valid for a second reference station, and then receiving data that is valid for the second reference station. The method further comprises providing the respectively received data for a positioning of a device comprising a satellite signal receiver, the data for the first reference station and the data for the second reference station including measurements on satellite signals.

The device that is to be positioned can be the same as the one receiving the data or a different one.

Moreover, a first apparatus is described, which comprises a receiving component configured to receive data that is valid for a first reference station, to receive in parallel for a limited time data that is valid for the first reference station and data that is valid for a second reference station, and to receive data that is valid for the second reference station. The apparatus further comprises a processing component configured to provide the respectively received data for a positioning of a device comprising a satellite signal receiver, the data for the first reference station and the data for the second reference station including measurements on satellite signals.

The components of the first apparatus can be implemented in hardware and/or software. They may comprise for instance a processor executing software program code for realizing the required functions. Alternatively, it could be for instance a circuit that is designed to realize the required functions, for instance implemented in a chipset or a chip, like an integrated circuit. The described apparatus can be for example identical to the comprised processing component, but it may also comprise additional components. The apparatus could further be for example a module provided for integration into a device, like a wireless communication terminal or an accessory device for a wireless communication terminal.

Moreover, a first device is described, which comprises the described first apparatus and in addition a user interface. Such a device could be for instance a mobile terminal or an accessory device for a mobile terminal. The device could comprise in addition a wireless communication component enabling a communication with another device and/or the mentioned satellite signal receiver. Such a device could also belong to an arrangement, which comprises in addition another device including the satellite signal receiver or a wireless communication component.

Moreover, a first computer program code is described, which realizes the described first method when executed by a processor. Moreover, a first computer program product is described, in which such a program code is stored in a computer readable medium. The computer program product could be for example a separate memory device, or a memory that is to be integrated in an electronic device.

Moreover, a second method is described, which comprises providing data that is valid for a first reference station for transmission to a device, then providing in parallel for a limited time data that is valid for the first reference station and data that is valid for a second reference station for transmission to the device, and then providing data that is valid for the second reference station for transmission to the device. The data for the first reference station and the data for the second reference station include measurements on satellite signals.

Moreover, a second apparatus is described, which comprises a processing component configured to provide data that is valid for a first reference station for transmission to a device, to provide in parallel for a limited time data that is valid for the first reference station and data that is valid for a second reference station for transmission to the device, and to provide data that is valid for the second reference station for transmission to the device. The data for the first reference station and the data for the second reference station include measurements on satellite signals.

The processing component of the second apparatus can equally be implemented in hardware and/or software. It may be for instance a processor executing software program code for realizing the required functions. Alternatively, it could be for instance a circuit that is designed to realize the required functions, for instance implemented in a chipset or a chip, like an integrated circuit. The described apparatus can be for example identical to the comprised processing component, but it may also comprise additional components. The apparatus could further be for example a module provided for integration into a device, like a network server or a standalone server.

Moreover, a second device is described, which comprises the described apparatus and in addition an interface configured to transmit the provided data to another device. The second device could be for instance a positioning server.

Moreover, a second computer program code is described, which realizes the described second method when executed by a processor. Moreover, a second computer program product is described, in which such a program code is stored in a computer readable medium. The computer program product could be for example a separate memory device, or a memory that is to be integrated in a server. Finally, a system is described, which comprises the first described apparatus and the second described apparatus.

Thus, assistance data for a satellite based positioning including measurements on satellite signals for changing reference stations is provided in the case of a change of reference station with measurements for both reference stations for a certain period of time.

The invention thus provides a possibility of improving the performance and usability of a satellite based positioning. It enables in particular, though not exclusively, a continuous high-accuracy navigation using changing reference stations. Providing measurements from the current and the new reference station simultaneously enables a soft handover between the reference stations. That is, a completely new, time-consuming initialization for the new reference station after each change can be avoided to achieve high-accuracy navigation without interruption.

In one exemplary embodiment, the measurements on satellite signals comprise carrier-phase measurements on satellite signals. Carrier phase measurements can be used for obtaining observables, which allow tracking a baseline between the satellite signal receiver and the reference station, once integer ambiguities have been solved.

The first reference station and the second reference station for which measurements are provided could be for instance virtual reference stations. Virtual reference stations can be generated at any desired location and thus always close to the current location of the device which is to be positioned. It is to be understood, however, that the invention could equally be employed for example with a server, which is able to receive measurements from a plurality of distributed physical reference stations comprising satellite signal receivers.

In the case virtual reference stations are used, a respective virtual reference station can be generated upon a respective request by the device including the satellite signal receiver which is to be positioned or by a device which is linked to the including the satellite signal receiver. The request could then include an indication of a current rough or precise position of the device including the satellite signal receiver.

The data provided for a positioning may be used in different ways.

In one embodiment, providing the received data for a positioning may comprise for example storing the data together with data including measurements on satellite signals received by the satellite signal receiver. The stored data may then be used in a post-processed at any desired location, for example locally or at a network server.

In another embodiment, the provided data is used for example in a real time or near real time positioning of the device including the satellite signal receiver.

In both cases, the provided data that is valid for the first reference station and data provided by the satellite signal receiver can be used for solving integer ambiguities for a baseline between the satellite signal receiver and the first reference station and for tracking the baseline between the satellite signal receiver and the first reference station. Provided data that is valid for the first reference station and provided data that is valid for the second reference station, which have been received in parallel, and data provided by the satellite signal receiver can then be used for solving integer ambiguities for a baseline between the satellite signal receiver and the second reference station. Finally, provided data that is valid for the second reference station, data provided by the satellite signal receiver and the solved integer ambiguities for a baseline between the satellite signal receiver and the second reference station can be used for tracking the baseline between the satellite signal receiver and the second reference station.

Thereby, the loss of a high-accuracy position and an interruption in a high-accuracy navigation can be avoided whenever a new reference station is taken into use, for instance because the device with the satellite signal receiver which is to be positioned moves too far away from the current reference station.

In any embodiment which comprises forming observables and/or solving ambiguities, the observables can be for instance double-difference observables and the integer ambiguities can be for instance double-difference integer ambiguities. It is to be understood, however, that any other kind of observables and corresponding ambiguities could be used as well, including but not limited to single and triple difference observables and integer ambiguities.

The invention can be employed for example in high-precision navigation and surveying applications. It can be provided for professional use, but also for fun applications, such as writing with a GNSS receiver.

The invention can further be used with any kind of satellite signals, in particular, though not exclusively, with satellite signals transmitted in a GNSS, like GPS, GLONASS, GALILEO, SBAS, QZSS, LAAS or a combination of these. LAAS makes use of pseudolites instead of true satellites, but these pseudolites are to be understood to be covered as well by the term satellite as used in this application. LAAS has the advantage that it enables a positioning under indoor conditions as well.

It is to be understood that all presented exemplary embodiments may also be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
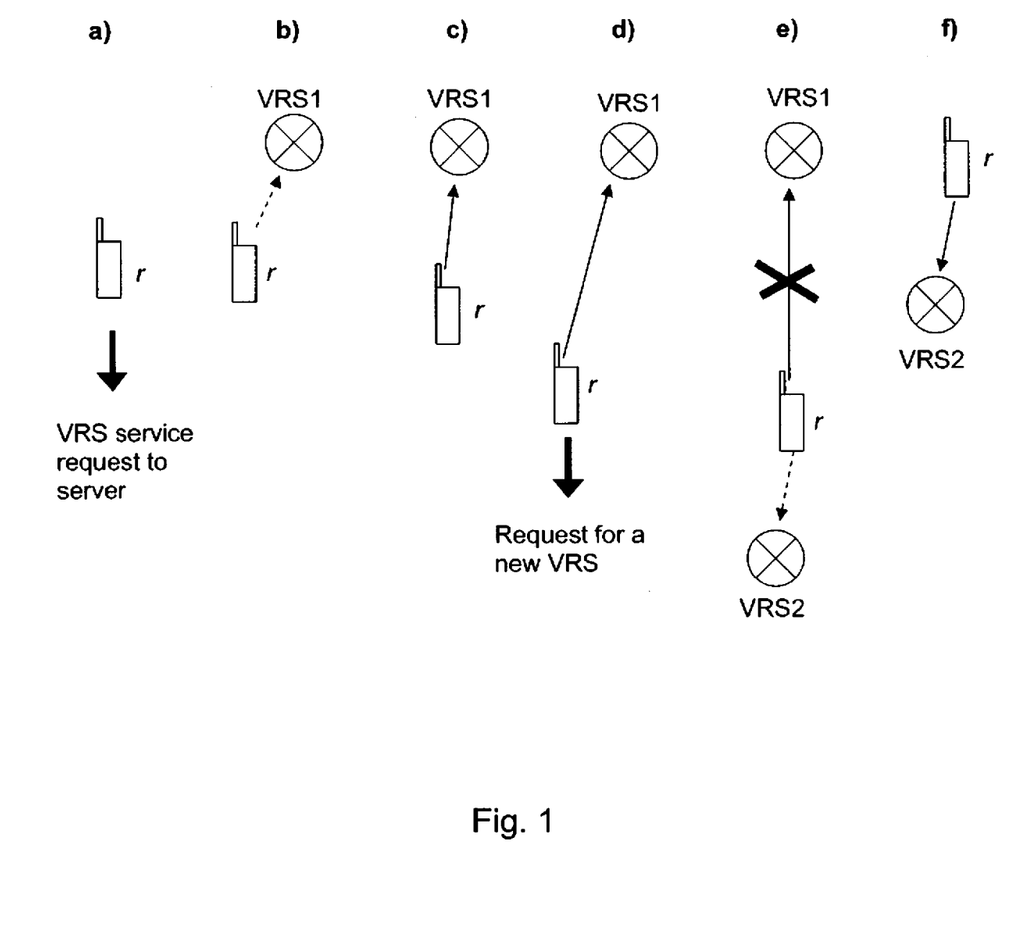
FIG. 1 is a diagram schematically illustrating a possible change of a virtual reference station with intermittent high-accuracy navigation.
Figure 2:
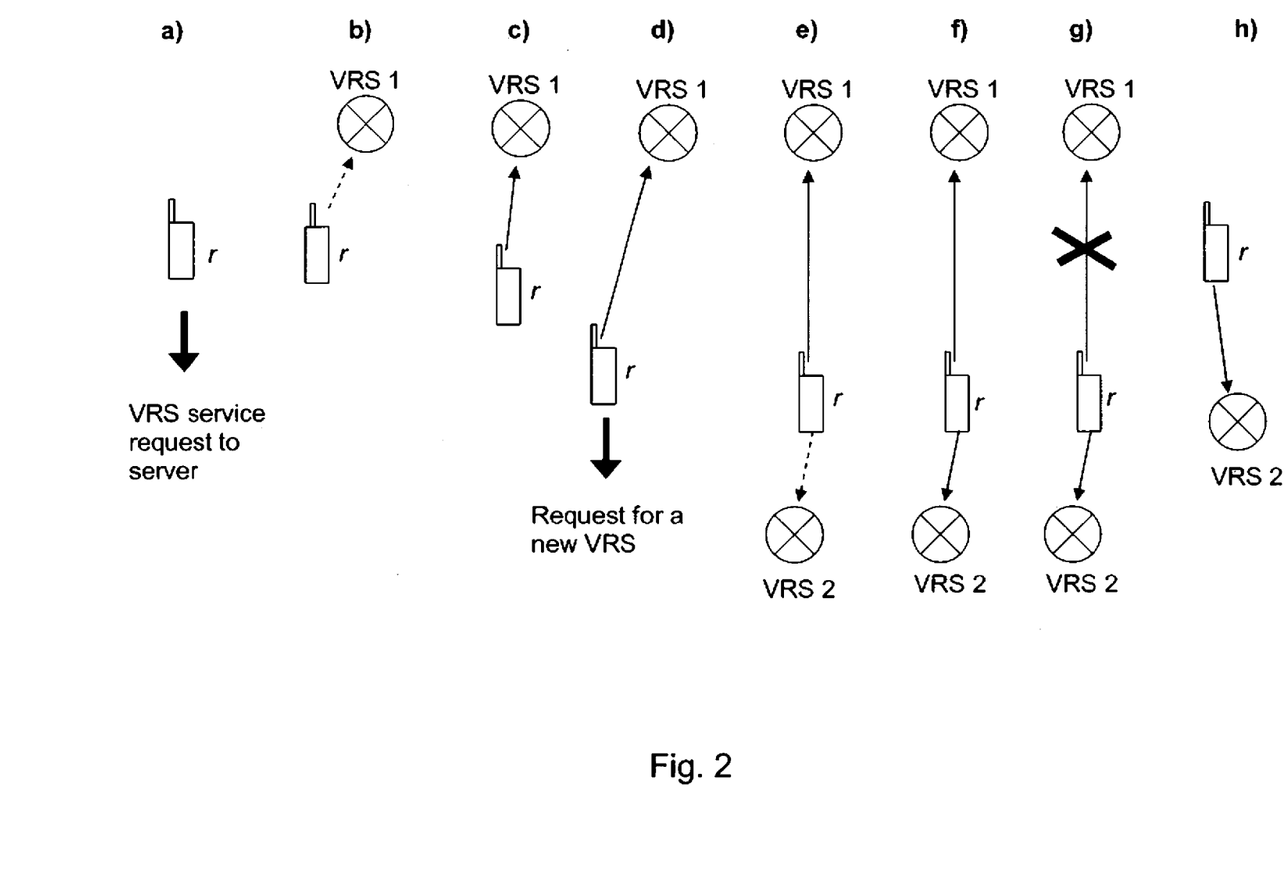
FIG. 2 is a diagram schematically illustrating a possible change of a virtual reference station with continuous high-accuracy navigation in accordance with an embodiment of the invention.

FIGS. 1 and 2 schematically illustrate the difference between intermittent high accuracy navigation and continuous high-accuracy navigation in accordance with an embodiment of the invention.

In both cases, an assisted GNSS (AGNSS) enabled rover r wants to perform a high-precision navigation using carrier-phase measurements from a virtual reference station. The distance to the virtual reference station should be as short as possible to improve the reliability and speed of the baseline determination. If the distance increases significantly, a new virtual reference station should be generated and used. Baselines are indicated in both Figures as arrows pointing from a rover r to a virtual reference station.

FIG. 1 presents steps a) to f) of a first possible approach for changing from one virtual reference station to another.

For beginning a navigation session, the rover r sends a request for virtual reference station measurements to a server (step a). The request comprises the current position estimate for the rover r, determined for instance by conventional GNSS positioning.

Upon receipt of the request, the server generates a virtual reference station VRS1. The position estimate enables the server to generate the virtual reference station VRS1 as close to the rover r as possible in order to minimize the baseline length. The server streams measurements for the virtual reference station VRS1 to the rover r. The rover r then initiates double-difference integer ambiguity resolution computations (step b).

Once the ambiguities are solved, the baseline to the virtual reference station VRS1 is available and can be tracked. The accurate absolute position of the rover r can be determined based on the baseline and on the known position of the virtual reference station VRS1 (step c).

When the rover r is moving, the length of the tracked baseline may increase. At some point, the rover r takes the decision that the baseline is too long and requests for measurements for a new virtual reference station at the current location of the rover r (step d).

Upon receipt of the request, the server generates a new virtual reference station VRS2 and stream measurements for new virtual reference station VRS2 instead of old virtual reference station VRS1 to the rover r. The rover r starts to receive the new VRS measurements, and simultaneously the data from the first virtual reference station VRS1 is lost. Therefore, also the baseline and the accurate position of the rover r are lost for a while, since it takes some time, usually 10 to 100 seconds depending upon signal conditions and baseline length, to solve the new integer ambiguities and the baseline with respect to a new virtual reference station VRS2 (step e).

Having initialized the new ambiguities, the navigation can continue (step f).

FIG. 2 presents steps a) to h) of a second possible approach for changing from one virtual reference station to another without loosing the accurate navigation capability for tens of seconds in accordance with an embodiment of the invention.

Steps a) to d) of FIG. 2 correspond to those of FIG. 1.

Upon receipt of the request for a new virtual reference station from the rover r, however, the server generates a new virtual reference station VRS2 and streams measurements for new virtual reference station VRS2 in addition to measurements of old virtual reference station VRS1 to the rover r. The rover r receives measurements from the both virtual reference stations VRS1 and VRS2 (step e). Thus, in contrast to FIG. 1, the baseline to the first virtual reference station VRS1 is not lost as soon as measurements for the second virtual reference station VRS2 are received.

Now, the since the baseline between the first virtual reference station VRS1 and the rover r on the one hand and the baseline between the two virtual reference stations VRS1 and VRS2 on the other hand are both known, the baseline between the second virtual reference station VRS2 and the rover r may also be determined (step f).

Therefore, when the transmission of measurements for the first virtual reference station VRS1 is stopped after a while and the baseline to this virtual reference station VRS1 is lost (step g), the high-accuracy navigation continues without discontinuity (step h).

The approach of FIG. 2 is thus of particular advantage in situations in which a baseline has to be tracked with high-precision for a moving rover.

Figure 3:
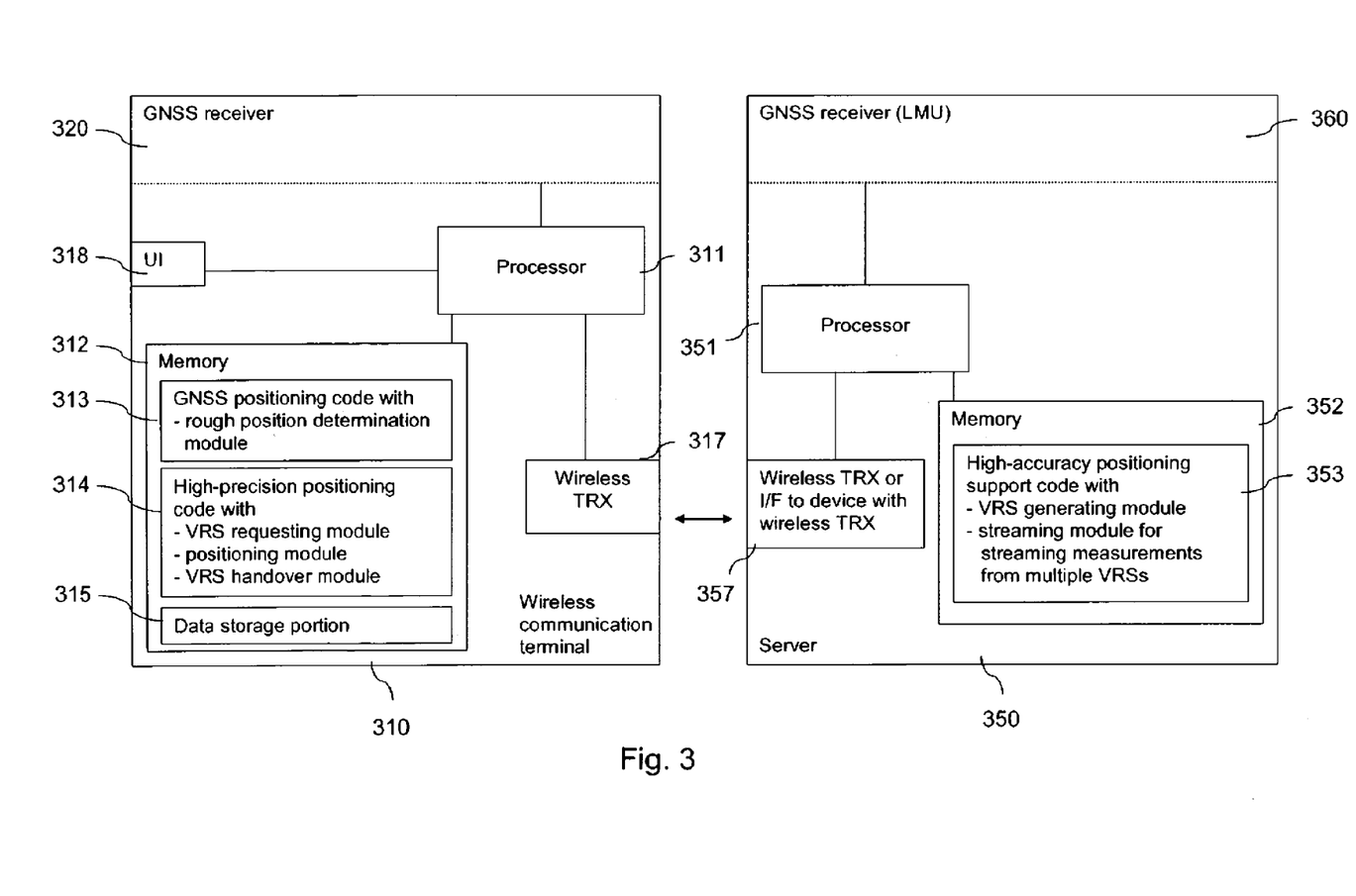
FIG. 3 is a schematic block diagram of a system according to an embodiment of the invention.

FIG. 3 is a schematic block diagram of a first exemplary system, which allows a continuous high-precision navigation using virtual reference stations.

The system comprises a wireless communication terminal 310 and a server 350.

The wireless communication terminal 310 can be for instance a mobile phone or a laptop. The terminal 310 comprises a processor 311 and, linked to this processor 311, a memory 312, a transceiver (TRX) 317 and a user interface (UI) 318.

The processor 311 is further linked to a GNSS receiver 320. The GNSS receiver 320 may be integrated in the terminal 310. Alternatively, though, it could also be or belong to an accessory device that is connected to the terminal 310. This option is indicated in FIG. 3 by a dotted line between the GNSS receiver 320 and the other components of terminal 310. A GNSS accessory device could be connected to the user device 310 via any suitable link, like a physical connection or a Bluetooth™ link, etc.

The processor 311 is configured to execute implemented computer program code. The memory 312 stores computer program code, which may be retrieved by the processor 311 for execution. The stored program codes comprise a GNSS positioning code 313, which includes a functional module for a conventional rough GNSS based positioning. The stored program codes further comprise a high-precision positioning code 314, which includes functional modules for requesting VRS measurements, for handling a soft VRS handover and for performing the actual high-precision positioning. The memory 312 further provides a data storage portion 315, which can be accessed by the processor 311.

It is to be understood that the functions of the processor 311 executing program code 313 and 314 could also be implemented in hardware in the terminal 310, for example in the form of correspondingly configured components of an integrated circuit chip. Further, it is to be understood that some functions realized by the processor 311 could be realized in an alternative embodiment for example by the GNSS receiver 320.

The transceiver 317 enables a communication via a wireless link with other devices. The transceiver 317 could belong for instance to a cellular engine of the terminal 310 and support an access to a cellular communication network, or it could belong to a WLAN engine of the terminal 310 and support an access to a WLAN. Alternatively, the transceiver 317 could also enable for example a wireless link to a stand-alone server using any known technology.

The user interface 318 may provide input and/or output functionality. It could comprise for example keys, a touchpad, a display, loudspeakers, etc.

The server 350 can be for instance a network element, like a base station of a cellular communication network or a WLAN, or a server linked to such a base station. It is to be understood that it could also be a stand-alone server, though.

The server 350 comprises a processor 351 and, linked to this processor 351, a memory 352 and an interface 357.

The processor 351 is further linked to a GNSS receiver 360. The GNSS receiver 360 comprises an antenna, which has a reference point at an accurately known position. The GNSS receiver 360 may be integrated in the server 350. Alternatively, though, it could also belong to a separate device, like a location measurement unit (LMU) that is connected to the server 350. This alternative is indicated in FIG. 3 by a dotted line between the GNSS receiver 360 and the other components of server 350. A location measurement unit could be connected to the server 350 using any suitable link, for example a wired link.

The processor 351 is configured to execute implemented computer program code. The memory 352 stores computer program code, which may be retrieved by the processor 351 for execution. The stored computer program codes comprise a high-accuracy positioning support code 353, including functional modules for generating virtual reference stations and for streaming measurements for multiple virtual reference stations.

It is to be understood that the functions of processor 351 executing program code 353 could also be implemented in hardware in server 350, for example in the form of correspondingly configured components of an integrated circuit chip. Further, it is to be understood that some functions realized by the processor 311 could be realized in an alternative embodiment for example by the GNSS receiver 360.

The interface 357 enables a direct or indirect communication with terminal 310. If the server 350 is a base station of a wireless communication network, for example, the interface 357 could be a transceiver, which enables the terminal 310 to access the wireless communication network. If the server 350 is another network element, the interface may be an interface to further network elements, which connect the server to a base station of a wireless communication network that may be accessed by the terminal 310.

The GNSS receivers 320, 360 are both configured to operate as normal GNSS receivers. That is, they are configured to receive, acquire, track and decode signals transmitted by satellites belonging to one or more GNSSs, like GPS and Galileo. Based on the navigation information in the decoded signals and on measurements on the received signals, processor 311 is further able to compute a rough position of an antenna reference point of GNSS receiver 320 in a known manner using program code 313.

For a particular application, however, the position of the antenna reference point of GNSS receiver 320 might have to be determined with high precision. To this end, an enhanced high-accuracy positioning is employed, which is illustrated in the flow chart of FIG. 4.

Figure 4:
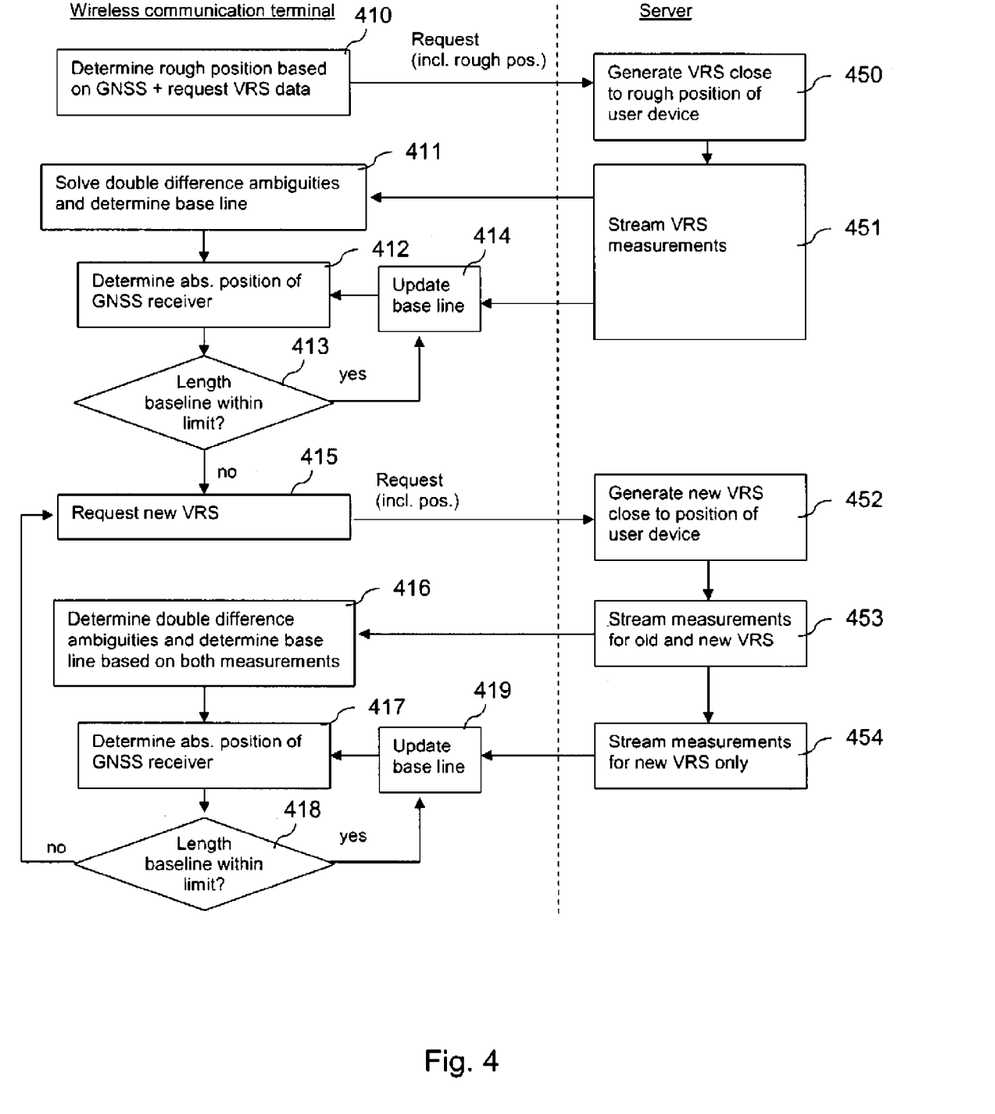
FIG. 4 is a flow chart illustrating an exemplary operation in the system of FIG. 3.

The high-accuracy positioning can be initiated for instance by a user via user interface 318, which causes the processor 311 to executed program code 314.

Using computer program code 313, which may be called by program code 314, the processor 311 of terminal 310 determines at first a rough position estimate of the GNSS receiver 320 based on navigation information in received satellite signals. Using computer program code 314, the processor 311 of terminal 310 further generates a request for VRS measurements, which is transmitted to server 350 via transceiver 317 (step 310). The request includes an indication of the rough position estimate. In addition, the request may indicate the type of signals for which VRS measurements are desired. Moreover, GNSS receiver 320 is requested to provide carrier-phase measurements on all visible satellites.

The processor 351 of server 350 receives the request via interface 357. Using program code 353, the processor 351 generates a virtual reference station VRS k at the location of the received rough position estimate and requests carrier-phase measurements on satellite signals from GNSS receiver 360 (step 450). It may request such measurements specifically for an indicated type of signals. The processor 351 converts the received carrier-phase measurements for the known location of GNSS receiver 360 into carrier-phase measurements for the virtual reference station VRS k.

The processor 351 streams the determined carrier-phase measurements via interface 357 to the terminal 310 (step 451). The provided data may further include other information. In case the virtual reference station is not generated exactly at a location corresponding to the position estimate for the GNSS receiver 320, such information may also comprise the accurate location of the virtual reference station.

The processor 311 of the user device 310, which receives the messages from the server 350 via transceiver 317, is now able to perform relative positioning computations using double difference observations. The double difference observations are formed from the carrier phase measurements received from the server 350 for the virtual reference station and carrier phase measurements received from GNSS receiver 320 (step 411).

The relative positioning computations aim at solving the double-difference integer ambiguities. The problem formulation may lead to the following exemplary measurement equation:

$$\phi_{kr}^{pq} = \rho_{kr}^{pq} + \lambda N_{kr}^{pq} + \epsilon_{kr}^{pq} \qquad (1)$$

where $\phi_{kr}^{pq}$ is the double difference observable defined by $\phi_{kr}^{pq} = (\phi_k^p - \phi_r^p) - (\phi_k^q - \phi_r^q)$, where $\phi_k^p$, $\phi_r^p$, $\phi_k^q$, $\phi_r^q$ are the available carrier phase measurements by the reference station k (VRS) and the rover r (GNSS receiver 320) of the signals originating from the satellites p and q. Moreover, $\rho_{kr}^{pq}$ the difference of geometric ranges defined by $$\begin{aligned}\rho_{kr}^{pq} &= (\rho_k^p - \rho_r^p) - (\rho_k^q - \rho_r^q) \qquad (2)\\ &= (\|\underline{x^p} - \underline{x_k}\| - \|\underline{x^p} - (\underline{x_k} - \underline{b})\|) - \\ & \quad (\|\underline{x^q} - \underline{x_k}\| - \|\underline{x^q} - (\underline{x_k} - \underline{b})\|),\end{aligned}$$

where $x^p$ and $x^q$ are the known positions of the satellites p and q, respectively. $x_k$ is the known position of the reference station (VRS) and $b=x_k-x_r$ is the unknown baseline to be determined. Finally, $\lambda$, $N_{kr}^{pq}$ and $\epsilon_{kr}^{pq}$ are the wavelength, unknown double difference ambiguity (note that $N_{kr}^{pq} \in \aleph$) and double-difference measurement noise, respectively.

It has to be noted that a time variable has been omitted from the equations for the sake of clarity. However, accounting for different measurement instants and time-of-flight differences between the receivers may be required for a determination of the baseline. Further, it has to be noted that presented equation (1) represents a simplified form of a measurement equation, which may be modified and extended in various ways.

Solving equation (1), which can be realized with any suitable approach, yields the fixed baseline estimate $\check{b}$ and double-difference ambiguities $\check{N}$.

As mentioned above, using double differences has the advantage that double differencing errors that are common to a given satellite signal in two receivers cancel out. Examples for such common errors comprise satellite clock bias as well as errors induced by the troposphere and the ionosphere.

Finally, the processor 311 may determine an accurate absolute position of the GNSS receiver 320, or more specifically of its antenna reference point, by subtracting the baseline vector from the available accurate co-ordinates of the virtual reference station (step 412).

Figure 5:
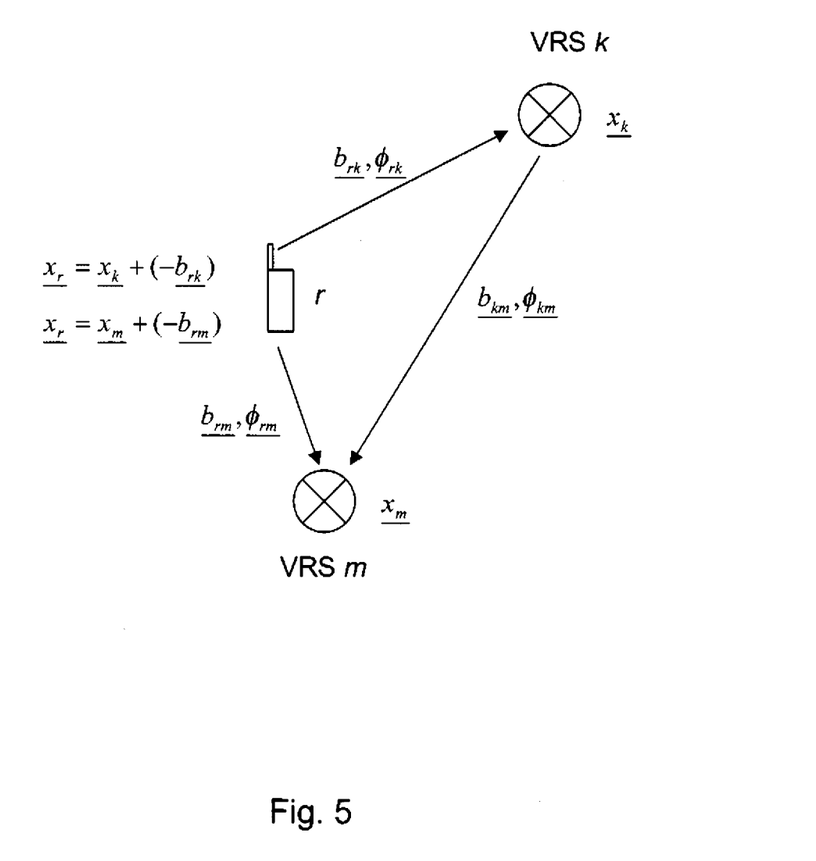
FIG. 5 is a diagram schematically illustrating parameters used in the operation of FIG. 4.

This is illustrated as well in FIG. 5. FIG. 5 is a schematic diagram, in which terminal 310 is represented as a rover r at location $x_r$. In addition, the virtual reference station is shown as VRS k at location $x_k$. When the baseline $b_{rk}$ between rover r and virtual reference station VRS k has been determined using double difference observable $\phi_{kr}^{pq}$ (the satellite superscripts p and q being omitted in FIG. 5), the position of rover r can be determined to be $x_r = x_k + (-b_{rk})$.

An indication of the absolute position of the GNSS receiver 320 may be presented for example to a user via user interface 318.

The processor 311 checks whether the length of the determined baseline exceeds a predetermined lengths (step 413). As long as this is not the case, the processor 311 tracks changes in the baseline at high precision using the solved double difference integer ambiguities and new carrier-phase measurements (step 414) and updates the absolute position of GNSS receiver 320 accordingly (step 412).

When the processor 311 determines, however, that the length of the determined baseline exceeds a predetermined lengths (step 413), it requests a new virtual reference station from the server 350 (step 415). The request includes the current position of the GNSS receiver 320.

Upon receipt of the new VRS request, the processor 351 generates a new virtual reference station VRS m at the indicated location of the current position of the GNSS receiver 320 (step 452). The processor 351 now converts the received carrier-phase measurements for the known location of GNSS receiver 360 for a certain time period into carrier-phase measurements for the old virtual reference station VRS k and in addition into carrier-phase measurements for the new virtual reference station VRS m. The VRS m at location $x_m$ is equally indicated in FIG. 5.

The processor 351 streams the determined carrier-phase measurements for both virtual reference stations VRS k and VRS m to the terminal 310 (step 453). The provided data may further include other information. The server 350 and a protocol implemented by the software code 353 are thus required to support binding at least two virtual reference stations to a single terminal.

The processor 311 of terminal 310 is now able to solve the double difference integer ambiguities and to determine the baseline for the new virtual reference station in a simplified manner (step 416), for instance as presented in the following.

The baseline $b_{rk}$ between the GSNN receiver 320 (rover r) and the old virtual reference station VRS k and the associated double-difference integer ambiguities are known. Thus all parameters of measurement equation (1) applied to an exemplary pair of a base satellite 1 and a further satellite q are known:

$$\begin{aligned}\phi_{rk}^{1q} &= (\phi_r^1 - \phi_k^1) - (\phi_r^q - \phi_k^q) \qquad (3)\\ &= \rho_{rk}^{1q} + \lambda N_{rk}^{1q} + \varepsilon_{rk}^{1q}\\ &= (\rho_r^1 - \rho_k^1) - (\rho_r^q - \rho_k^q) + \lambda N_{rk}^{1q} + \varepsilon_{rk}^{1q}\\ &= (\|\underline{x^1} - (\underline{x_k} - \underline{b_{rk}})\| - \|\underline{x^1} - \underline{x_k}\|) - \\ & \quad (\|\underline{x^q} - (\underline{x_k} - \underline{b_{rk}})\| - \|\underline{x^q} - \underline{x_k}\|) + \lambda N_{rk}^{1q} + \varepsilon_{rk}^{1q}\end{aligned}$$

Now, as the new virtual reference station VRS m is taken into use, a corresponding measurement equation can be formed for the same pair of satellites for virtual reference stations VRS k and VRS m. In the equation, the vector for the baseline $b_{km}$ between virtual reference stations VRS k and VRS m can be replaced by $x_m - x_k$, since the accurate positions $x_k$ and $x_m$ of both virtual reference stations are available:

$$\begin{aligned}\phi_{km}^{1q} &= (\phi_k^1 - \phi_m^1) - (\phi_k^q - \phi_m^q) \qquad (4)\\ &= \rho_{km}^{1q} + \lambda N_{km}^{1q} + \varepsilon_{km}^{1q}\\ &= (\rho_k^1 - \rho_m^1) - (\rho_k^q - \rho_m^q) + \lambda N_{km}^{1q} + \varepsilon_{km}^{1q}\\ &= (\|\underline{x^1} - \underline{x_k}\| - \|\underline{x^1} - \underline{x_m}\|) - (\|\underline{x^q} - \underline{x_k}\| - \|\underline{x^q} - \underline{x_m}\|) + \\ & \quad \lambda N_{km}^{1q} + \varepsilon_{km}^{1q}\end{aligned}$$

Also the double difference observables $\phi_{km}^{1q}$ in this equation can be calculated from the carrier-phase measurements received for the two virtual reference stations VRS k, VRS m.

Further, since the two virtual reference stations VRS k, VRS m provide the processor 311 with measurement data for some time, the measurement noise $\epsilon_{km}^{lq}$ can be filtered away. Therefore, it is straightforward to solve the double-difference ambiguities $N_{km}^{lq}$ that corresponds to the baseline between the two virtual reference stations.

Baseline $b_{km}$ and double difference observables $\phi_{km}^{lq}$ for this baseline are equally represented in FIG. 5 (omitting the satellite identifiers).

Based on the known parameters from equation (3), the parameters that can be obtained with equation (4) and the double difference observable $\phi_{rm}^{lq}$ for GNSS receiver 320 and new virtual reference station VRS m, for example the following equation can be used for obtaining the double-difference integer ambiguities $N_{rm}^{lq}$ corresponding to the baseline $b_{rm}$ between the GNSS receiver 320 (rover r) and the new VRS m, without lengthy initialization:

$$\phi_{rm}^{lq} = \begin{bmatrix} 1 & 0 \\ 0 & 1 \end{bmatrix} \begin{bmatrix} \phi_{rk}^{lq} \\ \phi_{km}^{lq} \end{bmatrix} \quad (5)$$

$$= \begin{bmatrix} 1 & 0 \\ 0 & 1 \end{bmatrix} \begin{bmatrix} \rho_{rk}^{lq} \\ \rho_{km}^{lq} \end{bmatrix} + \lambda \begin{bmatrix} 1 & 0 \\ 0 & 1 \end{bmatrix} \begin{bmatrix} N_{rk}^{lq} \\ N_{km}^{lq} \end{bmatrix} + \begin{bmatrix} 1 & 0 \\ 0 & 1 \end{bmatrix} \begin{bmatrix} \varepsilon_{rk}^{lq} \\ \varepsilon_{km}^{lq} \end{bmatrix}$$

$$= \rho_{rm}^{lq} + \lambda N_{rm}^{lq} + \varepsilon_{rm}^{lq},$$

where $\rho_{rm}^{lq} = (\|x^l-(x_m-b_{rm})\|-\|x^l-x_m\|)-(\|x^q-b_{rm})\|-\|x^q-x_m\|)$ (6)

$N_{rk}^{lq}$ and $N_{km}^{lq}$ could be mapped to $N_{rm}^{lq}$, which then allows for solving baseline $b_{rm}$, since $\phi_{rm}^{lq}$ is known. This baseline solution $b_{rm}$ could be cross-checked with $b_{rk}+b_{km}$ in order to ensure a successful resolution. The only condition for solving equation (6) is thus that the terminal 310 receives measurements from the both virtual reference stations VRS k and VRS m for a short period of time.

Baseline $b_{rm}$ and double difference observables $\phi_{rm}^{lq}$ for this baseline are equally represented in FIG. 5 (omitting the satellite identifiers).

It has to be noted that it would also be possible to solve the double difference integer ambiguities corresponding to the baseline $b_{rm}$ between the rover r and the new VRS m directly based on equation (1), since the baseline $b_{rm}=b_{rk}+b_{km}$ is known. However, the approach presented above has the advantage that equation (4) is based on perfect computational measurements from the server 350 for the virtual reference stations. Hence, the ambiguity solving using this equation is more reliable due to less noise than in a case, in which ambiguities corresponding to $b_{rm}$ are directly solved.

Once the new integer ambiguities have been determined, the data pipe to the first virtual reference station VRS k may be terminated. That is, after a predetermined (or adaptively determined) period of time, the processor 351 of server 350 may stop determining carrier-phase measurements for the old virtual reference station and stream measurements for the new virtual reference station only to the terminal 310 (step 454).

The processor 311 may now determine the accurate absolute position of the GNSS receiver 320 again by subtracting the baseline vector to the new virtual reference station from the available accurate co-ordinates of the new virtual reference station (step 417).

This absolute positioning is illustrated as well in FIG. 5: when the baseline $b_{rm}$ between GNSS receiver 320 (rover r) and the new virtual reference station (VRS m) has been determined, the position of rover r can be determined with high precision to be $x_r = x_m + (-b_{rm})$.

The processor 311 checks whether the length of the determined baseline exceeds a predetermined lengths (step 418). As long as this is not the case, the processor 311 tracks changes in the baseline at high precision using the solved double difference integer ambiguities and new carrier-phase measurements (step 419) and updates the absolute position of GNSS receiver 320 accordingly (step 417).

As soon as the processor 311 determines, however, that the length of the determined baseline exceeds a predetermined lengths (step 418), the process may continue with step 415.

It is to be understood that it is not required that the positioning computations are carried out in real-time. Alternative, the processor 311 could store the received carrier-phase measurements together with associated carrier-phase measurements from the GNSS receiver 320 for enabling a post processing in the terminal 310 or at an external entity.

The presented approach has thus the advantages that it allows change between different virtual reference stations without losing the high-accuracy position solution for a while. The proposed approach also reduces the processor load and power consumption, since there is no need to calculate computationally exhaustive integer ambiguity solutions on every change of the virtual reference station.

The functions illustrated by the processor 311 executing program code 314 can be viewed as means for receiving data that is valid for a first reference station, means for receiving in parallel for a limited time data that is valid for the first reference station and data that is valid for a second reference station, as means for receiving data that is valid for the second reference station, and as means for providing the respectively received data for a positioning of a device comprising a satellite signal receiver, the data for the first reference station and the data for the second reference station including measurements on satellite signals. Alternatively, the functions illustrated by the functional modules of the program code 314 can be viewed as such means.

The functions illustrated by the processor 351 executing program code 353 can be viewed as means for providing data that is valid for a first reference station for transmission to a device, as means for providing in parallel for a limited time data that is valid for the first reference station and data that is valid for a second reference station for transmission to the device, and as means for providing data that is valid for the second reference station for transmission to the device, wherein the data for the first reference station and the data for the second reference station include measurements on satellite signals. Alternatively, the functions illustrated by the functional modules of the program code 353 can be viewed as such means.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
using, by an apparatus, received measurements on satellite signals that are valid for a first reference station and data provided by a satellite signal receiver for solving integer ambiguities for a baseline between the satellite signal receiver and the first reference station and for tracking the baseline between the satellite signal receiver and the first reference station; and
performing, by the apparatus, a change of reference station by
using measurements on satellite signals that are valid for the first reference station and measurements on satellite signals that are valid for a second reference station, which have been received in parallel for a limited time for supporting the change of reference station, and data provided by the satellite signal receiver for solving integer ambiguities for a baseline between the satellite signal receiver and the second reference station under consideration of a baseline between the first reference station and the second reference station, and by
using received measurements on satellite signals that are valid for the second reference station, data provided by the satellite signal receiver and the solved integer ambiguities for a baseline between the satellite signal receiver and the second reference station for tracking the baseline between the satellite signal receiver and the second reference station.

2. The method according to claim 1, wherein the measurements on satellite signals comprise carrier-phase measurements on satellite signals.

3. The method according to claim 1, wherein the first reference station and the second reference station are virtual reference stations.

4. The method according to claim 1, further comprising storing data including received measurements on satellite signals that are valid for the first reference station and data including received measurements on satellite signals that are valid for the second reference station together with data including measurements on satellite signals received by the satellite signal receiver.

5. The method according to claim 1, further comprising using the received measurements on satellite signals data in a real time or near real time positioning of a device comprising the satellite signal receiver.

6. An apparatus comprising at least one processor and at least one memory including computer program code, the at least one memory and the computer program code configured to cause the apparatus at least to perform:
using received measurements on satellite signals that are valid for a first reference station and data provided by a satellite signal receiver for solving integer ambiguities for a baseline between the satellite signal receiver and the first reference station and for tracking the baseline between the satellite signal receiver and the first reference station; and
performing a change of reference station by
using measurements on satellite signals that are valid for the first reference station and measurements on satellite signals that are valid for a second reference station, which have been received in parallel for a limited time for supporting the change of reference station, and data provided by the satellite signal receiver for solving integer ambiguities for a baseline between the satellite signal receiver and the second reference station under consideration of a baseline between the first reference station and the second reference station; and by
using received measurements on satellite signals that are valid for the second reference station, data provided by the satellite signal receiver and the solved integer ambiguities for a baseline between the satellite signal receiver and the second reference station for tracking the baseline between the satellite signal receiver and the second reference station.

7. The apparatus according to claim 6, wherein the measurements on satellite signals comprise carrier-phase measurements on satellite signals.

8. The apparatus according to claim 6, wherein the first reference station and the second reference station are virtual reference stations.

9. The apparatus according to claim 6, wherein the at least one memory and the computer program code are further configured to cause the apparatus to perform:
store data including received measurements on satellite signals that are valid for the first reference station and data including received measurements on satellite signals that are valid for the second reference station together with data including measurements on satellite signals received by the satellite signal receiver.

10. The apparatus according to claim 6, wherein the at least one memory and the computer program code are further configured to cause the apparatus to use the provided data in a real time or near real time positioning of a device comprising the satellite signal receiver.

11. The apparatus according to claim 6, further comprising:
a user interface.

12. The apparatus according to claim 6, further comprising a wireless communication component configured to enable a communication with another device.

13. The apparatus according to claim 6, further comprising the satellite signal receiver.

14. The apparatus according to claim 6, wherein the apparatus is a wireless communication terminal.

15. A non-transitory computer readable storage medium in which computer program code is stored, the computer program code causing an apparatus to realize the following when executed by a processor:
using received measurements on satellite signals that are valid for a first reference station and data provided by a satellite signal receiver for solving integer ambiguities for a baseline between the satellite signal receiver and the first reference station and for tracking the baseline between the satellite signal receiver and the first reference station; and
performing a change of reference station by
using measurements on satellite signals that are valid for the first reference station and measurements on satellite signals that are valid for a second reference station, which have been received in parallel for a limited time for supporting the change of reference station, and data provided by the satellite signal receiver for solving integer ambiguities for a baseline between the satellite signal receiver and the second reference station under consideration of a baseline between the first reference station and the second reference station; and by
using received measurements on satellite signals that are valid for the second reference station, data provided by the satellite signal receiver and the solved integer ambiguities for a baseline between the satellite signal receiver and the second reference station for tracking the baseline between the satellite signal receiver and the second reference station.

16. A system comprising:

a first apparatus according to claim 6; and a second apparatus with at least one processor and at least one memory including computer program code, the at least one memory and the computer program code configured to cause the second apparatus at least to perform:

provide measurements on satellite signals that are valid for a first reference station for transmission to the first apparatus;

provide in parallel for a limited time measurements on satellite signals that are valid for the first reference station and measurements on satellite signals that are valid for a second reference station for transmission to the first apparatus; and provide measurements on satellite signals that are valid for the second reference station for transmission to the first apparatus.

17. The method according to claim 1, wherein at least for some time before the limited time, measurements on satellite signals that are valid for the second reference station have not been received by the apparatus; and wherein at least for some time after the limited time, measurements on satellite signals that are valid for the first reference station are no longer received by the apparatus.

18. The apparatus according to claim 6, wherein at least for some time before the limited time, measurements on satellite signals that are valid for the second reference station have not been received by the apparatus; and wherein at least for some time after the limited time, measurements on satellite signals that are valid for the first reference station are no longer received by the apparatus.

* * * * *